３,266,251
BURN RATE CONTROL VALVE FOR
CARTRIDGE STARTER
Donald J. Kacek, Rockford, Ill., assignor to Sundstrand Corporation, a corporation of Illinois
Filed Oct. 10, 1963, Ser. No. 315,316
6 Claims. (Cl. 60—39.47)

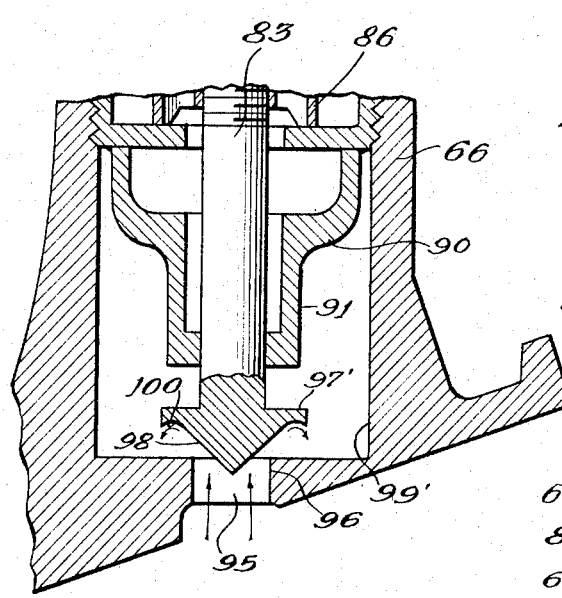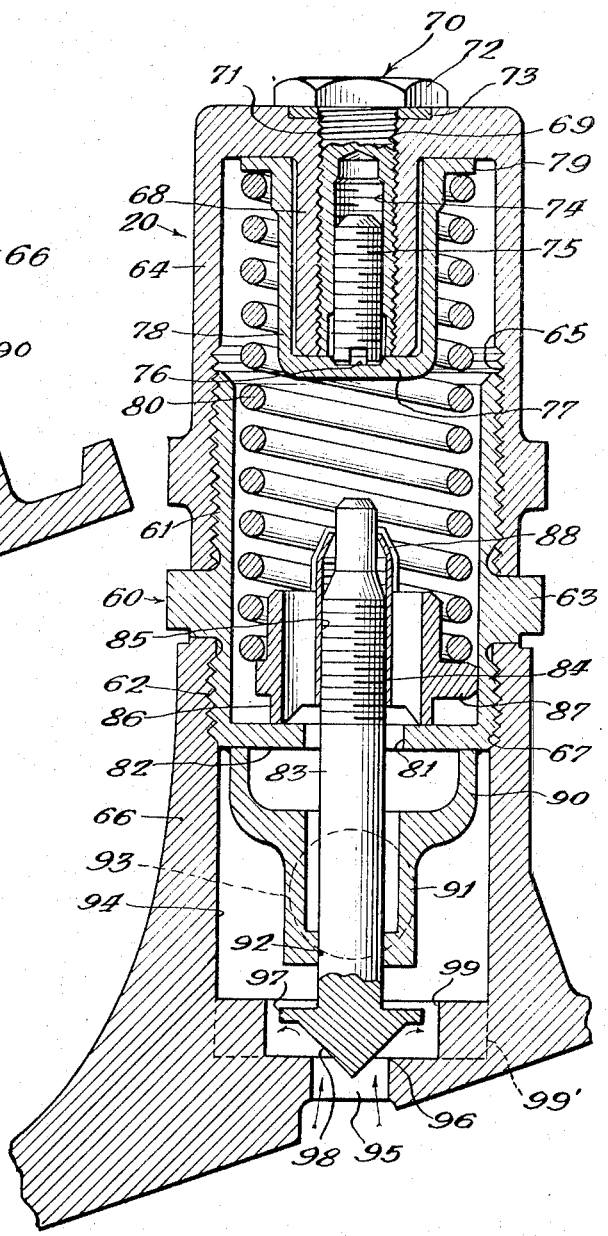

This invention relates in general to a cartridge type turbo-jet aircraft engine starter, and more particularly to a new and improved burn rate control valve therefor.

An object of the present invention is the provision of a relief valve which is flow-responsive as well as pressure-responsive so as to control the pressure in the combustion chamber of a turbo-jet engine starter, and thereby control the burn rate of the starter fuel.

The increasing use of turbo-jet engines in commercial and military aircraft has produced the need for a turbo-jet engine starter which will function satisfactorily under widely varying operational conditions. In the past great difficulty has been encountered in attempting to provide a turbo-jet engine starter which will provide a constant torque output under varying extremes of temperature and pressure. Accordingly, another object of the present invention is to provide a turbo-jet engine starter with a valve which will function to control the starter fuel burn rate under the various operating conditions, so as to provide controlled starter output torque as may be required.

A further object of the invention is to provide a variable orifice valve in a fluid system which is responsive both to the pressure of the fluid in the system, and to the flow of the fluid through the system.

Another object of the invention is to provide a relief valve for a turbo-jet engine starter which will enable the starter to produce a controlled output regardless of variations in the chemical composition of the starter fuel cartridge, and regardless of the temperature and pressure conditions under which the starter is operated.

These and other objects of the invention will become more fully apparent from the following specification and annexed drawings wherein:

FIG. 2 is an enlarged sectional view taken centrally through one embodiment of the present invention; and FIG. 3 is a fragmentary sectional view, similar to FIG. 2, showing another embodiment of the invention.

Figure 1:
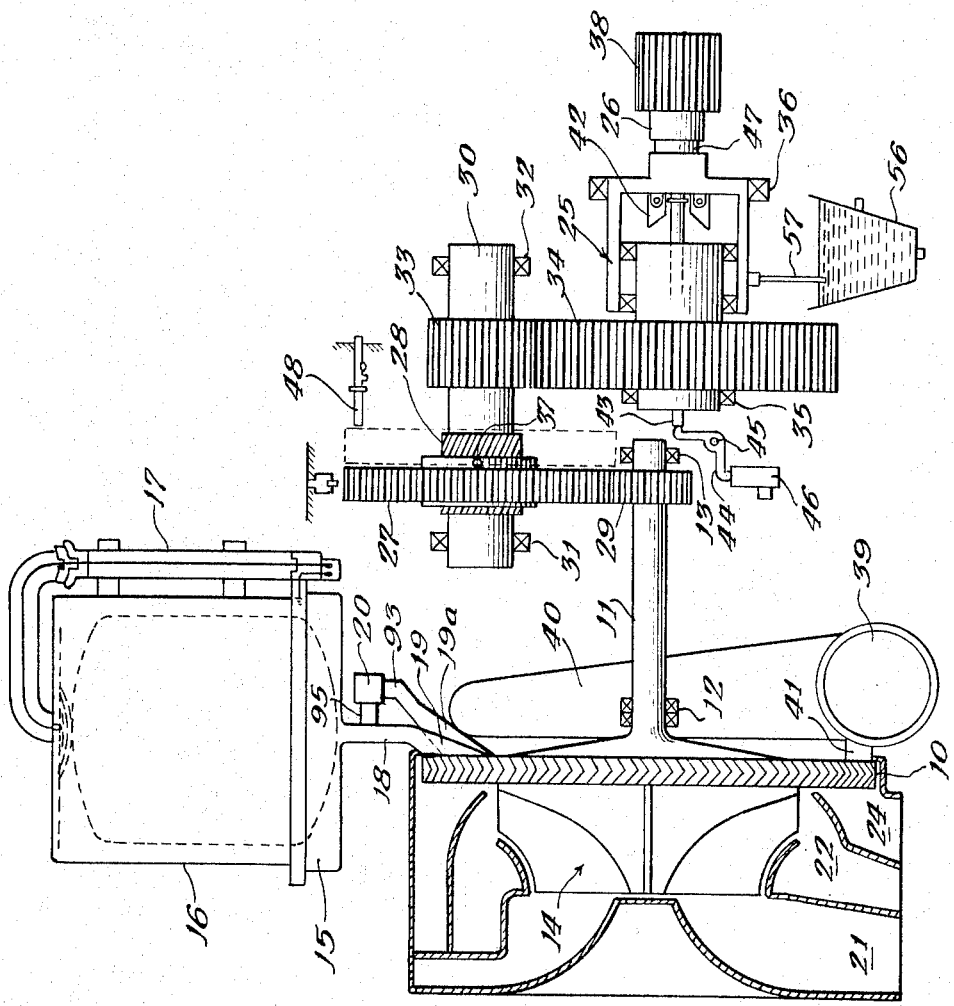
FIG. 1 is a schematic drawing illustrating a starter utilizing the valve of the present invention.

While this invention is susceptible to embodiment in many different forms, there is shown in the drawings and will herein be described in detail only specific embodiments, with the understanding that the present disclosure is to be considered as an exemplification of the principles of the invention and is not intended to limit the invention to the embodiments illustrated. The scope of the invention will be pointed out in the appended claims.

The relation of the operating elements of the present invention may be understood by reference to FIG. 1 which illustrates an arrangement in which the invention may be used. A turbine wheel 10 with blades around its periphery is provided on a turbine shaft 11 to rotate therewith. Turbine shaft 11 is rotatably supported by bearings 12 and 13 and has a fan 14 mounted on one end of the shaft 11 adjoining turbine wheel 10. A combustion chamber composed of a base 15 and a cover 16 is provided to contain a charge of solid propellant. An electrical wiring system 17 provides a means for igniting the solid propellant. Gases produced by the combustion of the solid propellant pass through a manifold 18 and through a set of nozzles 19, which direct the flow of gases to rotate turbine wheel 10. A relief valve 20 normally limits the gas pressure in manifold 18 and provides means for controlling the cartridge burn rate as will hereinafter become more fully apparent.

Fan 14 draws air in through an inlet ducting 21 and expels it through a passage 22. The fan torque increases with speed and is sized to limit the wheel speed to a safe value. The hot exhaust gases are expelled through a passage 24.

Turbine shaft 11 has a gear 29 fixed thereon and meshing with a gear 27 on a helical spline 28. The latter is rigid on a shaft 30 rotatable in bearings 31 and 32 and having a gear 33 fixed thereon. Gear 33 meshes with a gear 34 driving a one-way clutch 25 including an output shaft 26 having a gear 38 thereon adapted for driving connection with a jet engine to be started. The assembly composed of gear 34 and clutch 25 is rotatable in bearings 35 and 36. If the rotational velocity of the engine shaft connected with gear 38 exceeds the rotational velocity of the gear 34, the clutch prevents the starter from being driven by the engine.

If for any reason clutch 25 should fail to disengage when the engine speed exceeds that of the starter, a further safety means is provided by gear 27 mounted on helical spline gear 28. The helical spline of gear 28 is so orientated in supporting gear 27 that whenever gear 27 is driven by the turbine wheel 10 through shaft 11 and gear 29, the gear 27 tends to remain in mesh with the gear 29. However, whenever the engine speed exceeds that of the starter output shaft 26 to the extent that shaft 30 is driven at a greater rotational velocity (by the engine through gear 33, gear 34, clutch 25 and shaft 26) than it is driven by the turbine wheel 10 through the gears 28, 27, 29 and shaft 11, the gear 27 will slide (to the right in FIG. 1) on gear 28, disengaging gear 29. In order to prevent gear 27 from disengaging gear 29 because of small engine surges, a shear pin 37 normally secures gear 27 to gear 28. Whenever the torque on shaft 30 produced by the engine exceeds the drag produced by the fan 14 by a predetermined value, pin 37 will shear allowing gear 27 to disengage from gear 29.

The combination of gear 29, gear 27, gear 28, shaft 30, gear 33 and gear 34 provides a reduction gear means which suitably reduces the output rotational velocity of the starter output shaft 26 and increases the torque provided by wheel 10 to start the engine.

In the arrangement shown for purposes of illustration, provision is made for alternately driving the turbine wheel from a source of compressed air external to the aircraft. The compressed air is introduced to the blades of the turbine wheel 10 by a compressed air inlet 39, a compressed air manifold 40 and compressed air nozzles 41. The compressed air is exhausted through exhaust passage 24 and exhaust duct 23, in the same manner as the hot gases.

A set of flyweights 42 fly outwardly when the speed of output shaft 26 reaches a predetermined starter cutout speed, such as 2850 revolutions per minute, for example. Their outward movement operates a shaft 43 axially, rotating an arm 44 about a pin 45 to operate a switch 46. The operation of switch 46 may be utilized to cause a valve (not shown) to cut off the supply of compressed air to the inlet 39 through a suitable electric circuit (not shown). When the rotational velocity of shaft 26 decreases to approximately 1500 revolutions per minute, for example, the flyweights 42 will return to the position shown in FIG. 1, allowing microswitch 46 to return to its original condition.

The output shaft 26 may include a "necked down" section 47 for the purpose of allowing it to shear if the torque produced at this point of the shaft reaches a predetermined value, such as approximately 900 foot pounds, for example. Thus the shear action provides an additional safety means, to disengage the engine from the starter.

In order to indicate that shear pin 37 has sheared and that gear 27 is out of mesh with gear 29, a pin 48 may be provided which will be forced to protrude from a starter housing 49 whenever such a condition exists.

Lubrication for the reduction gears and their supporting shafts may be provided by an oil sump 56 and oil slingers as at 57.

Referring now to FIG. 2, relief valve 20 includes a valve body 60 having axially extending threaded external portions 61 and 62. A valve cap 64 is provided with an internally threaded portion, as at 65, which cooperates with the externally threaded portion 61 of valve body 60. A housing 66 is provided with an internally threaded portion, as at 67, which cooperates with the externally threaded portion 62 of valve body 60. Valve cap 64 and housing 66 are seated against an annular shoulder 63 provided on valve body 60.

Valve cap 64 includes a central cylindrically shaped axially extending member 68 internally threaded as at 69. The shank 71 of a screw 70 is threadably received in threaded bore 69, and a suitable sealing member 73 is provided under the head 72 of screw 70 to prevent any fluid from escaping outwardly past screw 70. Screw shank 71 is provided with an internally threaded central hole for reception of a set screw 75, the head of which is seated within a suitable recess 76 provided in the base 77 of a spring seat sleeve 78. A flange 79 is provided on the end of sleeve 78 remote from base 77, and it serves as a seat for one end of a compression spring 80. It will be readily understood that the initial force of spring 80 can be adjusted by threading set screw 75 to a desired position in threaded hole 74 prior to insertion of screw 70 in threaded bore 69.

The lower end of valve body 60, as viewed in FIG. 2, is provided with an inwardly extending flange 82 having a central opening 81, through which a plunger 83 extends. Plunger 83 includes an externally threaded portion 84 which is threadably received within an internal bore 85 in a movable spring seat member 86. Movable spring seat member 86 is provided with a plurality of radially extending fingers 87 against which the lower end of spring 80 is positioned. An axial extension of valve seat member 86 may be bent over as at 88 into engagement with the end of plunger 83 to lock the plunger against rotation relative to the spring seat member 86.

A guide member 90 is fixedly secured to flange 82, as by welding or the like, and includes a portion 91 of reduced diameter and having a central opening 92 which slidably receives the shank of plunger 83.

An exhaust port 93 is provided in the chamber defined between the internal wall 94 of housing 66 and the external surface of guide member 90, and as shown in FIG. 1, port 93 leads to a secondary nozzle 19a by means of which gas from the valve 20 is used at the wheel 10 for greatest efficiency. Housing 66 includes an inlet 95 which is in communication with manifold 18 so as to be constantly exposed to the hot gases flowing from the combustion chamber.

Housing 66 further includes an annular valve seat 96 communicating with inlet 95 and with the chamber formed between housing wall 94 and member 90. Plunger 83 includes an enlarged end portion having an annular flange 97 at the upper end of a smooth surfaced conical portion 98. Annular valve seat 96 and valve member 97, 98 are disposed in a relatively small chamber 99 only slightly larger than flange 97 for a purpose that will appear. It will be noted that in the valve closed position shown in FIG. 2, the conical plunger portion 98 is spaced a slight amount from the valve seat. The clearance is maintained to allow a small flow of high pressure gas to flow by the valve seat. The combination of the constant gas flow and the smooth tapered plunger portion 98 prevents collection of combustion residue on the valving surface which might after a period of time normally obstruct the valve opening.

It will be understood that the burn rate of propellant in the combustion chamber is a function of temperature and pressure in the chamber, and of course the composition of the propellant. Even though manufactured under strictly regulated procedures, various "grains" of propellant are likely to embody slight variations in composition by which one grain might be regarded as faster burning than another. Additionally, the starter may be used with aircraft in widely differing geographical locations such that at one time it might be used at temperatures well below 0° F. (e.g. —65°), and at another time at temperatures above 100° F. (e.g. +160°). Variations of this sort normally lead to varying rates of burning such that optimum starting conditions are not always provided. Specifically, the burn rate might be sufficiently low that insufficient starting torque is provided, for example.

The valve construction illustrated herein facilitates a very close control of the pressure in the starter and by virtue of this control assists in minimizing variations in the burn rate. Particularly, the provision of a tapered valve member cooperating with an annular valve seat provides a variable orifice by which pressure may be relieved and in effect such variable orifice provides a hot gas escape much like one of the nozzles for the turbine wheel and enables a variable flow rate of hot gases for controlling pressure. The valve is flow responsive and therefore senses the flow of combustion products. Thus, it senses burn rate for purposes of controlling burn rate by varying the pressure in the system.

Advantages of a control of this type will be readily understood and vary in degree with variations in the effectiveness of the flow-responsive flange. For example, if no pressure relief valve as at 20 were provided, because of minor differences in composition, with relatively open nozzles, a slow burning propellant on a cold day might burn at about 500 p.s.i. while a fast burning propellant on a hot day might burn at about 1200 p.s.i. By utilizing proper nozzles and a valve which is solely pressure-responsive, the difference may be reduced to extremes of 700 p.s.i. and 900 p.s.i., for example. Use of a proper flow-responsive valve as described enables further reduction of the difference and even complete elimination of the pressure differential and can provide burning at constant pressure, about 800 p.s.i., for example, under substantially all conditions. By increasing the flow sensitivity of the valve, pressures may be inverted so as to raise system pressure to a valve such as 900 p.s.i., for example, for a slow burning propellant on a cool day and to lower system pressure to 700 p.s.i., for example, for a fast burning propellant on a hot day, thereby to provide a constant burn rate under varying conditions rather than merely a constant pressure. The provisions of a constant burn rate results in providing a constant output torque.

In operation, if the propellant in the cartridge tends to burn at a rate in excess of a predetermined value, pressure in the system tends to increase and the cooperating valve parts 95–98 function to relieve the pressure, thereby to control and reduce variation in the burn rate in the cartridge. As the burn rate of the propellant in the cartridge is a function of temperature and pressure, control of the pressure enables control of the burn rate. But as the valve opens more and more, increasing the size of the relief orifice, less and less area of the conical valve portion 98 is disposed directly in the inlet 95 and exposed directly to system pressure to produce a valve opening force, and at the same time, the spring 80 opposing valve opening movement is compressed more and more and requires greater opening force. Thus, the valve opening force due to pressure becomes less effective as pressure increases. Flange 97, being disposed in the path of flow through the valve, is flow-responsive and assists in maintaining control pressure for controlled burn rate. Specifically, the force of the valve closing spring 80 is opposed by the force of pressure in the system and the force of flow through the valve. As the area of the valve member directly exposed to pressure decreases, the force on the valve member attributable to flow increases due to the increasing flow. The valve is thus pressure-sensitive and flow-sensitive and regulates pressure in the system as well as weight flow from the system.

The degree of flow sensitivity of the valve may be controlled by varying the shape of the plunger flange 97 and also by varying the relative size of the valve member 97, 98 and the surrounding chamber 99. In the valve embodiment of FIG. 2, with the chamber as illustrated in full lines at 99, the system is operated with a constant burn rate regardless of varying ambient conditions, by controlling the pressure to approximate 900 p.s.i. with a slow burning propellant on a cool day and to approximate 700 p.s.i. with a fast burning propellant on a hot day, for example. This effect is obtained by virtue of the relatively closely located wall of chamber 99 surrounding the flange 97 so that the major portion of the gases passing through the valve seat 96 are caused to impinge on the flange 97.

It will be understood that the effect of the flange will be reduced by enlarging the chamber 99 surrounding it, and when the wall of the chamber is enlarged to a degree illustrated in broken lines at 99', the pressure inversion is not attained, but the valve will be sufficiently flow-responsive to provide substantially constant pressure where this is desirable.

In FIG. 3 the valve form is such that the flange 97' is provided with a dished surface 100 which will substantially invert the flow of the gas impinging thereon as indicated by the arrows. As will be readily understood, the degree of flow sensitivity is proportional to the angle through which the gases are turned by the valve flange configuration, and the depth of the dished surface at 100 may be varied to control the valve sensitivity. With the valve form illustrated, the pressure inversion given in the example above is obtained with the chamber surrounding the valve member of relatively large diameter as illustrated at 99'.

I claim:
1. In an engine starter, a rotatable gas turbine wheel having means connected therewith for driving an engine, means providing a fuel combustion chamber, hot gas nozzle means disposed for directing combustion gases to said turbine wheel for rotating the latter, conduit means connecting said combustion chamber with said nozzle means, and pressure regulating relief valve means for maintaining a constant burn rate in the combustion chamber under varying temperature and pressure conditions, said regulating valve means being constantly in communication with said conduit means and responsive to flow through the valve means to increase the valve opening to reduced pressure upon increased flow caused by a pressure increase or a temperature rise in the chamber and decrease the valve opening to increase pressure upon decreased flow.

2. In an engine starter, a rotatable gas turbine wheel having means connected therewith for driving an engine, means providing a fuel combustion chamber, fuel ignition means adjacent the chamber for igniting fuel therein, hot gas nozzle means disposed for directing combustion gases to said turbine wheel for rotating the latter, conduit means connecting said combustion chamber with said nozzle means, and pressure regulating relief valve means for maintaining a constant burn rate in the combustion chamber under varying temperature and pressure conditions, said regulating valve means being constantly in communication with said conduit means and responsive to pressure in the conduit means and to flow through the valve means for controlling pressure in the conduit means and in the combustion chamber whereby the rate of burning of said fuel is controlled, said valve means including a valve seat and a cooperating resiliently yieldably mounted valve member exposed to pressure in said conduit means and movable relative to the valve seat for providing a variable relief orifice, said valve member including means disposed thereon in the path of flow therepast rendering the valve means flow-responsive, said valve means being constructed to respond to a weight flow of gases above a predetermined desired value from said fuel combustion chamber to reduce the pressure of the compressible gases in said conduit means to a value corresponding to the temperature in the combustion chamber at the desired predetermined burn rate of the fuel and to respond to a weight flow of gas below said predetermined desired value to increase the pressure of the compressible gases in said conduit means to a value corresponding to the temperature in the combustion chamber at the desired predetermined burn rate of the fuel whereby a substantially constant burn rate is maintained.

3. The combination as defined in claim 2, wherein said valve seat is provided by an annular shoulder at the end of a substantially cylindrical passage and said valve member is tapered and receivable in said cylindrical passage, and wherein the flow-responsive means comprises an annular outwardly flaring portion on the valve member adjacent the upper end of the tapered portion thereof.

4. A combination as defined in claim 3 wherein said outwardly flaring portion comprises a flange having a dished surface exposed to flow to maintain a constant burn rate.

5. A combination as defined in claim 3 wherein the valve means includes a cylindrical wall surrounding the periphery of the outwardly flaring portion and spatially disposed relative thereto, said outwardly flaring portion including a flange having a planar surface transverse to the axis of the cylindrical wall to maintain a constant burn rate.

6. In an engine starter, a rotatable gas turbine wheel having means connected therewith for driving an engine, a fuel combustion chamber for receiving and burning a solid fuel propellant of varying grain size and blend, hot gas nozzle means disposed for directing combustion gases to said turbine wheel for rotating the latter, conduit means for connecting said combustion chamber with said nozzle means, and pressure regulating relief valve means for maintaining a constant burn rate in the combustion chamber under varying temperature, pressure, and propellant blend conditions, said regulating valve means being constantly in communication with said conduit means and responsive to flow through the valve means to increase the valve opening to reduce pressure upon increased flow caused by a pressure increase or a temperature rise in the chamber and to decrease the valve opening to increase pressure upon decreased flow.

References Cited by the Examiner
UNITED STATES PATENTS

| | | | |
|---|---|---|---|
| 2,489,953 | 11/1949 | Burney | 60—35.6 X |
| 2,620,627 | 12/1952 | Nardone | 60—39.47 |
| 2,622,613 | 12/1952 | McNeal | 137—469 |
| 2,723,528 | 11/1955 | Stark et al. | 60—39.47 X |
| 2,980,132 | 5/1961 | Prijatel et al. | 137—469 |
| 2,986,879 | 6/1961 | Volk | 60—39.47 X |
| 2,994,194 | 8/1961 | Volk | 60—39.47 X |
| 3,065,597 | 11/1962 | Adamson et al. | 60—39.47 XR |
| 3,075,542 | 1/1963 | Diesing | 60—39.47 X |
| 3,078,668 | 2/1963 | Burriss | 60—39.25 |
| 3,102,386 | 9/1963 | Proell | 60—39.47 |

JULIUS E. WEST, *Primary Examiner.*
CARLTON R. CROYLE, *Examiner.*